United States Patent
Farquhar et al.

(10) Patent No.: US 12,247,943 B2
(45) Date of Patent: Mar. 11, 2025

(54) METHOD TO REDUCE UNWANTED SIGNALS ON AMPEROMETRIC SENSOR RESPONSE

(71) Applicant: Aeroqual Ltd., Auckland (NZ)

(72) Inventors: Anna Farquhar, Auckland (NZ); Geoffrey Henshaw, Auckland (NZ); David Williams, Kerikeri (NZ)

(73) Assignee: AEROQUAL LTD., Auckland (NZ)

( * ) Notice: Subject to any disclaimer, the term of this patent is extended or adjusted under 35 U.S.C. 154(b) by 602 days.

(21) Appl. No.: 17/555,569

(22) Filed: Dec. 20, 2021

(65) Prior Publication Data

US 2022/0196594 A1    Jun. 23, 2022

Related U.S. Application Data

(60) Provisional application No. 63/127,228, filed on Dec. 18, 2020.

(51) Int. Cl.
*G01N 27/403* (2006.01)
*G01N 27/404* (2006.01)

(52) U.S. Cl.
CPC ......... *G01N 27/404* (2013.01); *G01N 27/403* (2013.01)

(58) Field of Classification Search
CPC ............. G01N 27/404; G01N 27/4045; G01N 27/327; G01N 27/333; G01N 27/403
See application file for complete search history.

(56) References Cited

U.S. PATENT DOCUMENTS

| | | | |
|---|---|---|---|
| 4,776,203 A | 10/1988 | Jones | |
| 4,776,206 A | 10/1988 | Armstrong | |
| 5,007,988 A * | 4/1991 | Archer | G01N 27/4045 204/429 |
| 5,151,166 A * | 9/1992 | Harral | G01N 27/4065 204/426 |
| 5,320,732 A * | 6/1994 | Nankai | G01N 27/3272 204/406 |
| 5,810,997 A * | 9/1998 | Okazaki | G01N 27/407 205/784.5 |
| 7,323,098 B2 * | 1/2008 | Miyashita | C12Q 1/004 205/792 |

(Continued)

OTHER PUBLICATIONS

Mayer et al., "Transducers and electrodes—Faradaic resistance of the electrode/electrolyte interface," Med. & Biol. Eng. & Comput., 1992, 30, 538-542 (Year: 1992).*

(Continued)

*Primary Examiner* — Alexander S Noguerola
(74) *Attorney, Agent, or Firm* — BRYAN CAVE LEIGHTON PAISNER LLP

(57) ABSTRACT

Amperometric gas sensors have unwanted signals that are avoided by using two working electrodes, each having a resistor between the electrode and the current sensing circuit. The resistor has a value of more than 10% of the Faradaic resistor of the electrode. Two different resistors in parallel are switched in and out. The lower value resistor provides fast response for leak detection and safety. A higher value resistor is used for accurate information. The lower value resistor is switched in periodically for diagnostics. Machine-learning uses the periodic switching for determining offset as a function of temperature and humidity.

10 Claims, 1 Drawing Sheet

Equivalent circuit description of the working electrode in an amperometric sensor.

(56) References Cited

U.S. PATENT DOCUMENTS

2004/0124098 A1* 7/2004 Huang ............... G01N 27/3273
204/403.01
2005/0143635 A1* 6/2005 Kamath ............. A61B 5/14532
600/347

OTHER PUBLICATIONS

Geddes et al, "Measurement of the Direct-Current (Faradic) Resistance of the Electrode-Electrolyte Interface for Commonly Used Electrode Materials," Annals of Biomedical Engineering, vol. 29, pp. 181-186, 2001 (Year: 2001).*
Baron, R.; Saffell, J., "Amperometric Gas Sensors as a Low Cost Emerging Technology Platform for Air Quality Monitoring Applications: A Review", ACS sensors 2017, 2 (11), 1553-1566.
Farquhar, A. K.; Henshaw, G. S.; Williams, D. E., "Understanding and Correcting Unwanted Influences on the Signal from Electrochemical Gas Sensors", ACS sensors 2021, 6 (3), 1295-1304.
Popoola, O. A.; Stewart, G. B.; Mead, M. I.; Jones, R. L., "Development of a baseline-temperature correction methodology for electrochemical sensors and its implications for long-term stability", Atmospheric Environment 2016, 147, 330-343.
Samad, A.; Obando Nuñez, D. R.; Solis Castillo, G. C.; Laquai, B.; Vogt, U., "Effect of Relative Humidity and Air Temperature on the Results Obtained from Low-Cost Gas Sensors for Ambient Air Quality Measurements", Sensors 2020, 20 (18), 5175.
Williams, D. E., "Electrochemical sensors for environmental gas analysis", Current Opinion in Electrochemistry 2020, 22, 145-153.

* cited by examiner

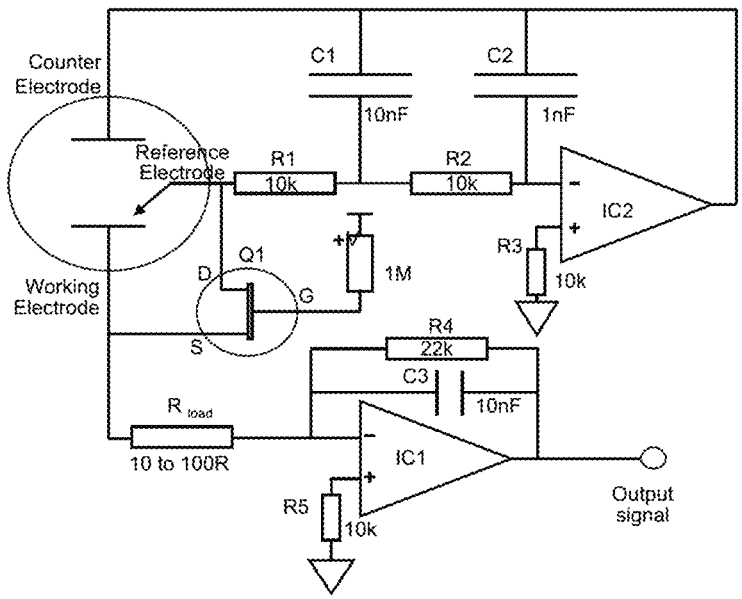
Figure 1: Typical potentiostatic circuit for GSE sensor operation.
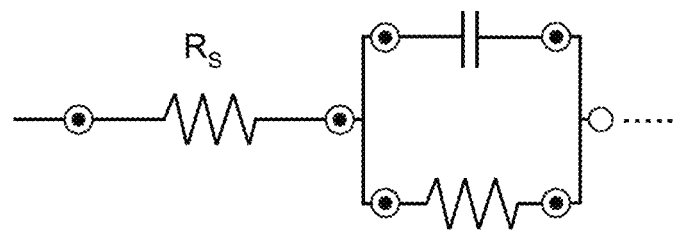
Figure 2: Equivalent circuit description of the working electrode in an amperometric sensor.
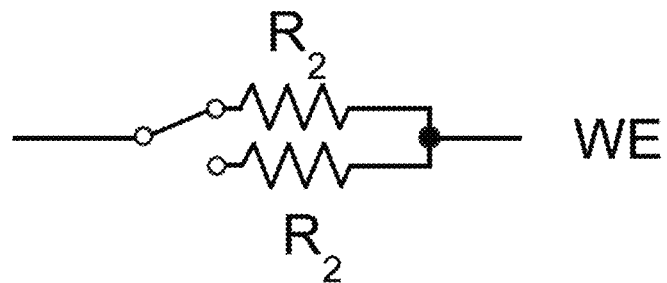
Figure 3: Schematic of circuit when the $R_{Load}$ resistor is replaced by two resistors R1 and R2 which can be independently selected in the circuit where R1 << R2

METHOD TO REDUCE UNWANTED SIGNALS ON AMPEROMETRIC SENSOR RESPONSE

This application claims the benefit of U.S. Provisional Application No. 63/127,228, filed Dec. 18, 2020, which is hereby incorporated by reference in its entirety as if fully set forth herein.

BACKGROUND OF THE INVENTION

Amperometric sensors generate small currents in response to the reaction of an electroactive species on the working electrode. However, such sensors are susceptible to current fluctuations in response to changes in environmental conditions. Previous work has indicated that changes in humidity, dew point and temperature generate baseline current fluctuations that can be of similar magnitude to the response of interest, making it difficult to determine whether sensor output is due to the target species or environmental conditions. Environmental conditions can also result in a persistent offset of the baseline current which further complicates the target species measurement.

Needs exist for improved gas sensors.

BRIEF DESCRIPTION OF THE DRAWINGS

FIG. 1 shows a typical potentiostatic circuit for GSE sensor operation.

FIG. 2 shows an equivalent circuit description of the working electrode in an amperometric sensor.

FIG. 3 shows a schematic of circuit when the $R_{load}$ resistor is replaced by two resistors R1 and R2 which can be independently selected in the circuit where $R_1 \ll R_2$.

DETAILED DESCRIPTION

These and further and other objects and features of the invention are apparent in the disclosure, which includes the above and ongoing written specification, with the claims and the drawings.

Amperometric sensors are typically operated using a potentiostatic circuit. FIG. 1. The circuit has two main components: the control circuit, which maintains the potential of the working electrode with respect to the reference electrode, and the current sensing circuit with a series of gain steps to amplify the signal. A resistor, designated as a load resistor ($R_{Load}$), is connected in series with the working electrode and current measuring circuit. The magnitude of the load resistor is selected to decrease noise while maintaining a fast response time and typically has a value between 10 and 100 ohms.

FIG. 1 shows a typical potentiostatic circuit for GSE sensor operation. Taken from Alphasense application note AAN 105-03 http://www.alphasense.com/index.php/air/application-notes/

Amperometric gas sensors are typically composed of two, three or four electrodes and an acid electrolyte. The working electrode is pressed against the back of a porous membrane, with the other side of the membrane exposed to the test atmosphere. The electrodes are commonly separated by a thin, electrolyte-soaked fabric. The working electrode is typically a high surface area porous material (often carbon), with a very high electrode capacitance. It can be described by the simplified equivalent circuit shown in FIG. 2. The $R_{Load}$ and working electrode make a simple RC circuit.

FIG. 2 shows an equivalent circuit description of the working electrode in an amperometric sensor. $R_S$ is the solution resistance, $C_{DL}$ is the double layer capacitance of the working electrode, and $R_F$ is the Faradaic resistance of the working electrode.

Environmental changes (e.g. changes in relative humidity) cause fluctuations in the amperometric sensor current, independent of the target gas concentration. We hypothesize that the changes in the water vapor pressure around amperometric sensors cause changes in the electrolyte concentration which results in a change in electrode capacitance. Since the working electrode is being held at a fixed potential by the potentiostatic circuit, the change in capacitance will likely cause a charging current at the working electrode that is likely the source of the current fluctuations due to changing environmental conditions.[1,2]

We have also found that the steady state background current depends on both the humidity at the gas inlet of the sensor and the temperature. The background steady state current ($I_{ss}$) can be estimated by $I_{ss} = \Delta E/(R_s + R_F + R_{load})$ where $\Delta E$ is the open circuit potential difference of the working and reference electrodes. $R_F$ is the Faradaic resistance of the working electrode which can be measured using simple electrochemical techniques including potential steps or electrochemical impedance spectroscopy. $R_S$ is the solution resistance and is generally a few ohms, and the value of $R_{load}$ as we have seen from previous examples is typically 10-100 ohms. $R_S$ and $R_{Load}$ are much smaller than the Faradaic resistance.

We have shown that if the value of $R_{load}$ is increased to be similar in magnitude to the Faradaic resistance of the electrode, the impact of environmental conditions on the sensor signal is significantly reduced, and the size of the reduction is greater than can be accounted for by just an increase in the RC filter component of the circuit. Increasing the resistance of $R_{Load}$ has two significant effects.

1. Increasing $R_{Load}$ in the circuit will decrease the steady-state offset current as $I_{ss} \approx \Delta E/(R_F + R_{Load} + R_S)$.
2. Since the amplitude of the current fluctuations due to variation of electrode capacitance would decrease with increasing $R_{Load}$, an increase of the load resistor magnitude will also decrease the amplitude of these current fluctuations.

The introduction of a larger $R_{Load}$ resistor will change the electrode potential of the working electrode, but since the current is small and the reaction to the target gas is at the diffusion limit, there would be no effect on the sensing signal.

The Faradaic resistance of an electrochemical gas sensor cell can be tens of thousands of ohms. We have found that increasing the value of $R_{load}$ to be greater than about 10% of the value of the Faradaic resistance significantly improves the sensor performance.

The introduction of a larger resistor would increase the response time constant. For typical amperometric sensors, with $C_{dl} \approx 50$ mF, use of a resistor of 10 k$\Omega$, similar to the Faradaic resistance of the background electrode reactions, would give a time constant of 500 s. If a switching circuit is used to switch between a smaller load resistor and a larger load resistor (FIG. 3), then the resistance can be switched in and out depending on the required application/response time.

FIG. 3 shows a schematic of circuit when the $R_{load}$ resistor is replaced by two resistors R1 and R2 which can be independently selected in the circuit where $R_1 \ll R_2$. For example, during calibration when a fast gas response is required, $R_1$, with a resistance between 10 and 100$\Omega$ may be used. Then, when the device is in normal operation, $R_2$ can be selected with a resistance greater than about 10% of the faradaic resistance of the working electrode, and the fluctuations caused by changing environmental conditions and the steady state offset current are decreased.

A second approach to reducing the impact of environmental conditions on sensor response is to calculate the steady state baseline current offset using an in-situ measurement of the zero bias potential ($\Delta E$). The baseline current of an amperometric sensor can be estimated by $I_{SS}=\Delta E/R_F$ (as $R_F \gg R_S$ and $R_{Load}$). The Faradaic resistance of the amperometric sensor is first determined under different environmental conditions (e.g. temperature or relative humidity) prior to use ($R_F$ changes with changing environmental conditions). For example, a small amplitude potential step (1-50 mV) is applied to the working electrode, for a predetermined period of time (at least 3 time constants) and the steady state current after the potential step is used to calculate $R_F$ at different humidity/temperature combinations. From this a calibration table detailing the temperature and humidity variation of $R_F$ is loaded into the instrument or data server. $\Delta E$ is then periodically measured during sensor operation, and the appropriate $R_F$ based on atmospheric temperature and humidity used to calculate the steady state baseline current offset.

Another approach to reduce the impact of environmental conditions on sensor response uses machine learning. If the large resistor $R_2$ (FIG. 3) is periodically switched into the circuit, the offset current may be deduced given an approximate value for the Faradaic resistance, from the resulting decrease in average current. The system could then "learn" the offset current as a function of temperature and humidity and apply a correction as appropriate when in operation with $R_1$.

Amperometric sensors can also be prepared with an additional working electrode. The additional working electrode in a four pin device is known as the auxiliary electrode. It is buried below the working electrode and is designed to respond to changes in the surrounding environment but not changes in the target gas concentration. Several publications have shown that the auxiliary electrode output can be used to correct for the steady state baseline current offset caused by temperature changes using an empirically derived algorithm where the auxiliary electrode output is subtracted from the working electrode output.[3-5] However, we have shown that like the working electrode, the auxiliary electrode will also respond to fluctuations in the environmental conditions, however the direction and magnitude of the auxiliary electrode current fluctuations are different to the direction and magnitude of the working electrode current fluctuations. Additionally, there is a time offset between the two electrode outputs. By subtracting the auxiliary electrode output from the working electrode output, the already large baseline current fluctuations are magnified rather than mitigated in many cases, and therefore the auxiliary electrode has limited usefulness in real-world applications if used in the way it was designed.

However, we have found an alternative way to use the auxiliary electrode to improve sensor performance. The auxiliary electrode is the same material (albeit sometimes smaller in area) as the working electrode and is in the same electrolyte. By perturbing the auxiliary electrode we can therefore probe the condition of the electrolyte without disrupting the gas sensing behaviour of the working electrode. One approach is to calculate the electrolyte solution resistance ($R_S$) using electrochemistry with the auxiliary electrode as the working electrode. For example, a small amplitude potential step (1-50 mV) is applied to the auxiliary electrode, for a predetermined period of time (at least 3 time constants). The output of this potential step is used to calculate the solution resistance. We have determined that the solution resistance changes with changing acid concentration and therefore by measuring this using the working electrode the condition of the electrolyte and by extension relative humidity could be determined. We have also established that the $C_{DL}$ of the auxiliary electrode changes with changing acid concentration. By measuring the capacitance of the auxiliary electrode the acid concentration and therefore the relative humidity could be evaluated.

While the invention has been described with reference to specific embodiments, modifications and variations of the invention may be constructed without departing from the scope of the invention, which is defined in the following claims.

We claim:

1. An amperometric sensor comprising a potentiostatic circuit for an amperometric sensor that uses a resistor with, for a given set of environmental conditions, a resistance greater than 10% of a working electrode's Faradaic resistance in series with one or more electrodes and the electrodes' current sensing circuit;
    wherein the working electrode's Faradaic resistance is equivalent to a resistance of a first resistor in parallel with a capacitor representing a double layer capacitance of the working electrode, wherein both the first resistor and the capacitor are in series with a second resistor representing the solution resistance; and
    wherein the amperometric sensor comprises two working electrodes, each with a resistor between the electrode and the current sensing circuit with a resistance greater than 10% of the Faradaic resistance of the electrode the resistor is in series with.

2. The amperometric sensor of claim 1, where the amperometric sensor is an amperometric gas sensor with at least two electrodes.

3. The amperometric sensor comprising the potentiostatic circuit of claim 1, in which the resistor in series with one or more working electrodes is replaced by two resistors of different magnitude in parallel that can be switched in and out of the circuit, with one resistor having resistance greater than 10% of the Faradaic resistance of its corresponding electrode.

4. The amperometric sensor comprising the potentiostatic circuit of claim 3, where the resistor in series with the working electrode is configured to be switched to a lower value resistor during calibration and fast response applications to increase response speed.

5. The amperometric comprising the potentiostatic circuit of claim 3, where one resistor is configured to be used during normal use and the other resistor is configured to be periodically switched in to determine a diagnostic property of the sensor or a change in a baseline steady state current of the amperometric sensor.

6. A method comprising determining a baseline steady state current of an amperometric gas sensor by firstly determining the zero bias potential difference ($\Delta E$) of a reference electrode and a working electrode, then using an atmospheric temperature and relative humidity to determine the working electrode's Faradaic resistance from a look up table of data of $R_F$ at different atmospheric temperature and humidity combinations, and thirdly calculating the baseline steady state current from the equation $I_{ss}=\Delta E/R$, where $I_{ss}$ is steady state current, $\Delta E$ is an open circuit potential difference of working and reference electrodes, and R is a resistance value that includes the Faradaic resistance of the working electrodes;

wherein the working electrode's Faradaic resistance is equivalent to a resistance of a first resistor in parallel with a capacitor representing a double layer capacitance of the working electrode, wherein both the first resistor and the capacitor are in series with a second resistor representing the solution resistance.

7. The method of claim 6, wherein the amperometric sensor comprises a circuit with two resistors of different magnitudes in parallel;

and the method comprises periodically switching the larger of the two resistors into the circuit and determining a change in the baseline steady state current as a function of a decrease in a current value that occurs in response.

8. The method of claim 6, further comprising using electrochemical analysis of a second working electrode to determine an acid concentration of the amperometric sensor.

9. A sensing device comprising an amperometric sensor having a potentiostatic circuit, a resistor in series between one or more electrodes and a current sensing circuit with, for a given set of environmental conditions, a resistance greater than 10% of a Faradaic resistance of a working electrode of the one or more electrodes, and a microprocessor for converting the working electrode's current output for a reading;

wherein the working electrode's Faradaic resistance is equivalent to a resistance of a first resistor in parallel with a capacitor representing a double layer capacitance of the working electrode, wherein both the first resistor and the capacitor are in series with a second resistor representing the solution resistance;

wherein the amperometric sensor comprises two working electrodes, each with a resistor between the electrode and the current sensing circuit with a resistance greater than 10% of the Faradaic resistance of the electrode the resistor is in series with.

10. The sensing device of claim 9, wherein the sensor is an amperometric gas sensor and the reading is gas concentration.

* * * * *